July 25, 1967  E. H. FISHER  3,332,362
CONVERTIBLE RAIL-HIGHWAY TRAILER
Filed Feb. 17, 1964  5 Sheets-Sheet 1
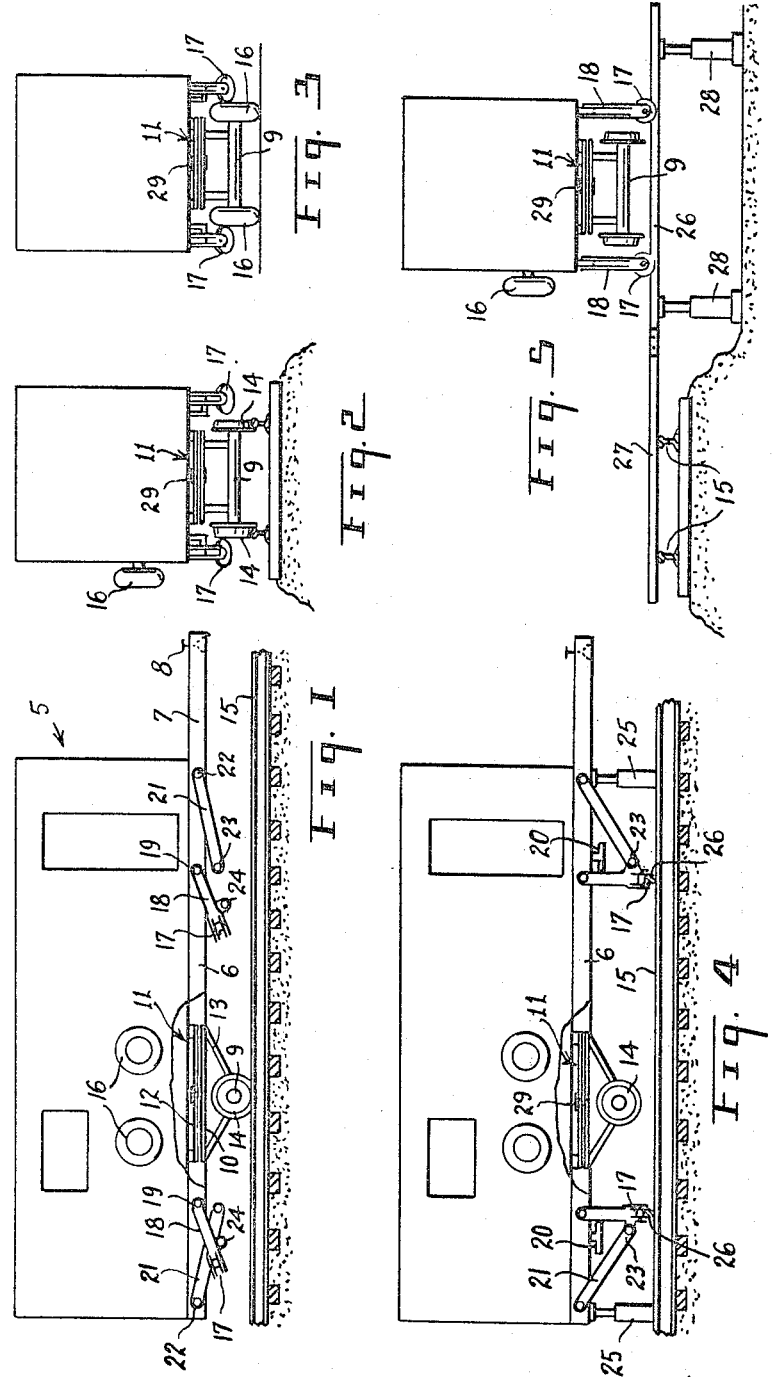
INVENTOR
E. H. FISHER
Featherstonhaugh & Co
ATTORNEYS July 25, 1967  E. H. FISHER  3,332,362
CONVERTIBLE RAIL-HIGHWAY TRAILER
Filed Feb. 17, 1964  5 Sheets-Sheet 2

INVENTOR
E. H. FISHER
Fetherstonhaugh & Co.
ATTORNEYS

July 25, 1967            E. H. FISHER            3,332,362
CONVERTIBLE RAIL-HIGHWAY TRAILER
Filed Feb. 17, 1964            5 Sheets-Sheet 3
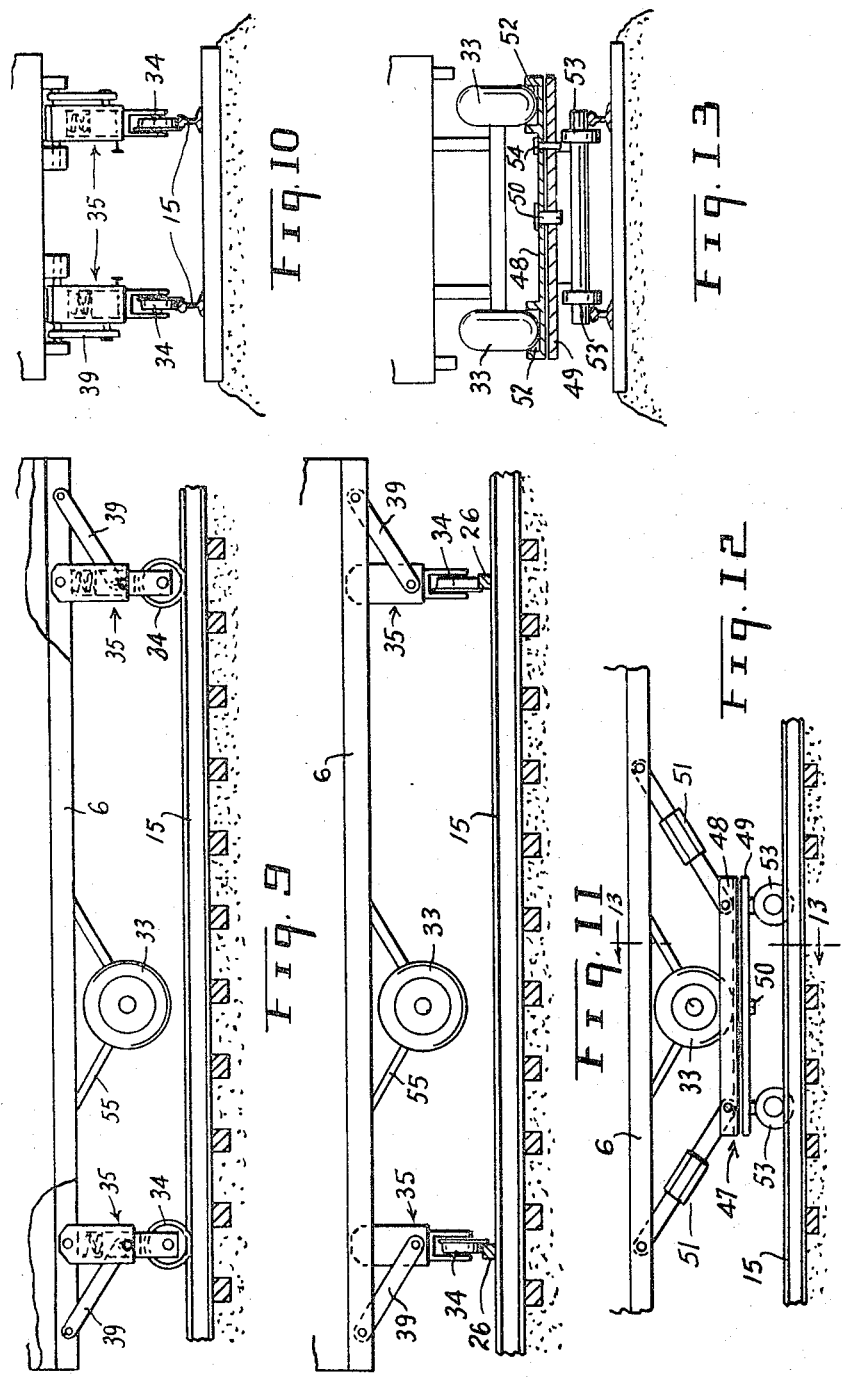
INVENTOR
E. H. FISHER
Fetherstonhaugh & Co.
ATTORNEYS

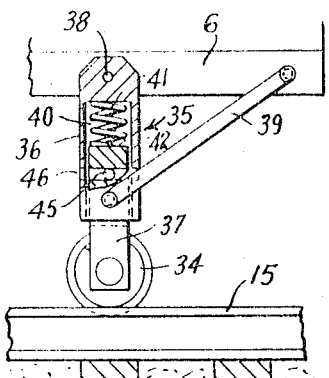
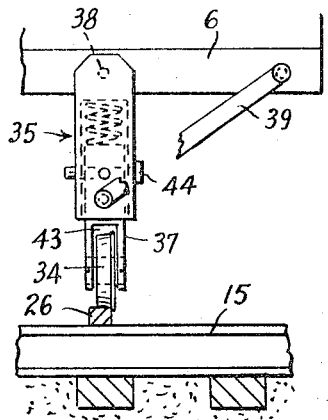
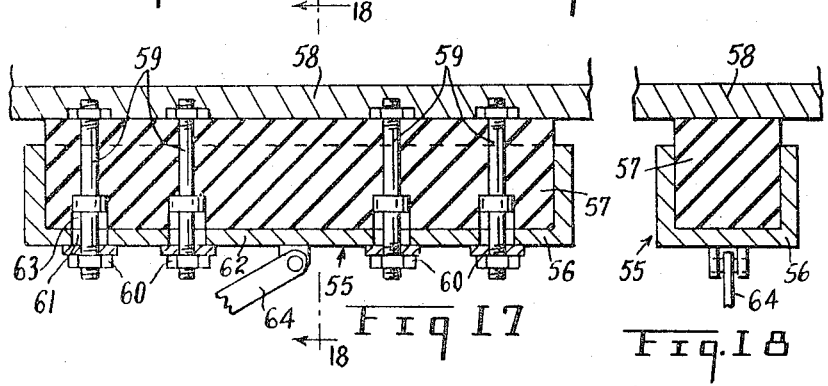
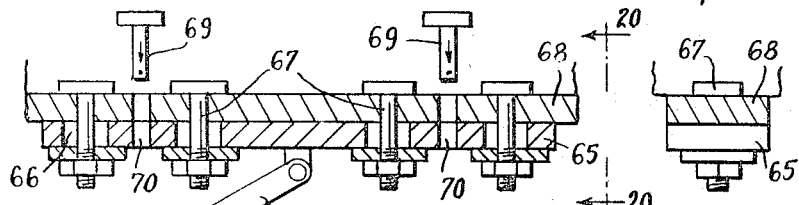
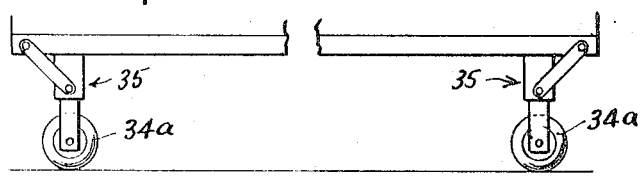

INVENTOR
E. H. FISHER
Fetherstonhaugh & Co.
ATTORNEYS

United States Patent Office 3,332,362
Patented July 25, 1967

3,332,362
CONVERTIBLE RAIL-HIGHWAY TRAILER
Earl H. Fisher, 630 Casgrain Ave., St. Lambert,
Montreal, Quebec, Canada
Filed Feb. 17, 1964, Ser. No. 345,306
Claims priority, application Canada, Jan. 25, 1964,
894,105
10 Claims. (Cl. 105—177)

This invention relates to trailers which can be readily converted for running on railway rails or on a highway and includes a set-off means whereby the trailer can be set off the track if desired at any suitable location along the right-of-way and returned to the rails for movement as required.

In the past, in railway track maintenance, it had been necessary to locate the highway type of trailer at the closest location to the work site permitted by suitable road facilities or to locate on-track bunk and boarding and other railway cars at a siding or passing track in proximity to the work site. The workmen had to travel greater distances to and from the aforementioned housing accommodation as the work progressed away from such more-or-less fixed locations. This shortened the productive work day to permit the workmen to return to the aforementioned housing accommodation within the allotted work day. In addition, on completion of the work on the rail line within a reasonable distance outwards from the location of either of the two aforementioned types of housing and boarding facilities, it has been the practice in the past to either move the highway trailer by road, by means of suitable automotive type of equipment, to the next acceptable housing and boarding location to the work site or move the on-track bunk and boarding facilities to a suitable siding or passing track by means of an on-track locomotive. Generally the latter equipment is moved in a train. The work gang would then be ready to move out from a new housing location to a new job site.

As the work area is extended away from the highway type trailer or the on-track housing facility, more and more time is taken up in the work gang going to the work location and returning to the trailer or the on-track facility. This also happens when tools, equipment, and supplies have to be moved back and forth by the work gang. Other delays may be incurred by: (a) Inability to move the on-track bunk and boarding car because of traffic conditions or available means to provide locomotive power for the movement. (b) Necessity to arrange and move the trailer by road to a new location.

In my co-pending application Ser. No. 305,492, now Patent No. 3,286,654, issued Nov. 22, 1966, there is set forth apparatus whereby the above difficulties are overcome by providing a highway-rail trailer which can be moved on the railway track to keep up with the forward movement of work gangs and be moved off the track at any location where set-off rails can be set up without being limited to siding locations as in the case where bunk or boarding cars are used for housing and boarding facilities, or where trailers are spotted near the work location contingent upon accessible roads.

The present invention is an improvement on the above mentioned patent application Ser. No. 305,492, now Patent No. 3,286,654, issued Nov. 22, 1966, in that provision is made whereby the highway-rail trailer is made more manoeuverable when used on road or rails in order to enable it to travel at higher speeds and negotiate curves with greater ease, and at the same time provide a fixed axle assembly necessary for travel on highways as a trailer.

The invention consists essentially in the provision of a bolster arrangement means for the axle assembly of a trailer, which bolster arrangement can be locked in either the position where the axle is located transversely of the trailer for movement of the trailer either on rails or on a highway, or located longitudinally of the trailer for movement of the trailer, on its axle mounted wheels, on set-off rails for movement of the trailer off the main rails on to a highway or vice versa. The invention is further characterized in that where set-off wheels are provided on the trailer, these set-off wheels can also be used for travel on the main rails by providing means whereby their assembly structure can be rotated about a vertical axis through 90° and the assembly structure is free to move up and down and be provided with shock absorbing means.

The present invention overcomes the above difficulties in that the proposed highway-rail trailer can be moved on the railway tracks to keep up with the forward movement of work gangs and be moved off the track at any location where set-off rails can be set up without being limited to siding locations as in the case where bunk and boarding cars are used for housing and boarding facilities, or where trailers are spotted near the work location contingent upon accessible roads. In addition, where work locations are separated by relatively long distances, the trailer can be quickly converted for highway travel and be taken from the railway track at a location reasonably close to the highway, driven along the highways to another location reasonably close to the railway and set back on the rail tracks. Also, the trailer can be removed from the rail track at convenient locations during peak periods of traffic on the line with little or no interruption of line traffic or of the work on the line.

The invention consists essentially in providing a vehicle of the trailer type with two sets of wheels interchangeable with each other. One set of pneumatic wheels for use in highway travel and the other set for use in travelling along the rails of a railroad.

Also included is a set of set-off wheels mounted on the ends of brackets which are pivotally mounted on the vehicle and can be braced in a vertical position below the vehicle for engagement with set-off rails set transverse to the main rail line for the purpose of moving the vehicle sideways to a position alongside the rail line.

When not in use, the set-off wheel brackets are pivoted into a position under the vehicle and secured. In one arrangement the highway wheels and the rail wheels are interchangeable with each other on a common axle. Alternately, the highway pneumatic wheels can be permanently mounted on an axle and run on the rails as well as on the highway. An additional pair of axles are located fore and aft of the pneumatic tired wheels and each carry a pair of dish wheels inwardly on the rails and serving to hold the vehicle and its pneumatic wheels against sideways movement on the rails. An outwardly extending portion of the dished wheels runs on the rails and takes a portion of the load of the vehicle, thereby reducing the load on the pneumatic wheels bearing on the rails. In this arrangement, the dished wheels are held in their operative position by spring mounted braces and can be moved upwards under the vehicle when the vehicle is operated on the highway.

In another embodiment of the invention, the dish wheels are mounted on axles located on a cradle, located above the axle carrying the pneumatic wheels. This cradle can be moved down to bring the dish wheels into engagement with the rails to hold the vehicle in transverse alignment and the pneumatic wheels in engagement with the top surface of the rails or moved upwards to permit free travel of the vehicle on the pneumatic wheels on the highway. In this assembly, the load of the vehicle is taken on the pneumatic wheels, the outwardly extending portion of the dished wheels is for safety only and come in contact with the rail in the event of a flat tire or tires. In still another embodiment of the invention, a dolly having two pairs of dish wheels and a pair of spaced-apart troughs to receive the pneumatic wheels is connected to the vehicle chassis by removable turnbuckles. When the vehicle is intended for travel on the rails, the dolly is engaged with the vehicle chassis and the turnbuckles are tightened to bring the troughs of the dolly into contact with the pneumatic wheels. In this assembly, total load of the vehicle is transmitted through the pneumatic wheels and dished wheels. For highway travel, the dolly is removed from under the vehicle and carried by it in any convenient manner.

The primary object of the invention is to provide a trailer type vehicle for use in railroad maintenance work which can be readily moved from place to place, either on the railroad tracks or along the highway and can be readily moved from railroad tracks to highway or vice versa.

A further object of the invention is to provide a trailer type vehicle with both rail and highway wheels and be provided with set-off wheels for transfer of the vehicle from the railway tracks to a highway or vice versa.

A further object of the invention is to provide means whereby set-off wheels can be used also for travel on railroad tracks.

A further object of the invention is to provide means whereby the road and rail wheel assemblies and the set-off wheel assemblies can rotate about vertical axes to facilitate high speed travel on railroad tracks.

A further object of the invention is to provide means whereby the road and rail wheel assemblies and/or the set-off wheel assemblies can be locked with their wheels located on an axis transverse to the trailer or on an axis longitudinally of the trailer.

A further object of the invention is to provide means whereby the set-off wheel assemblies are permitted a degree of vertical movement or can be locked against vertical movement if desired.

A further object of the invention is to provide means whereby greater coupling flexibility in the horizontal plane is provided between the trailer vehicle and the haulage vehicle for greater manoeuverability for travel either on a highway or railroad tracks.

These and other objects of the invention will be apparent from the following detailed specification and the accompanying drawings, in which:

FIG. 1 is a side elevation of a trailer type vehicle equipped with replaceable flanged wheels on a bolster arrangement for running on a railroad track and carrying a set of pneumatic wheels to replace the flanged wheels for highway travel, and showing set-off wheels supported under the vehicle chassis.

FIG. 2 is an end view of the vehicle shown in FIG. 1.

FIG. 3 is an end view similar to FIG. 2 but showing the vehicle fitted with pneumatic wheels and resting on highway road surface.

FIG. 4 is a side elevation similar to FIG. 1 but showing the vehicle elevated and the set-off wheels lowered into engagement with set-off rails.

FIG. 5 is an end elevation of the arrangement shown in FIG. 4 showing the vehicle moved sideways on the set-off rails to a position above a highway road surface.

FIG. 9 is a partial side elevation similar to FIG. 1 but showing the set-off wheels arranged for travel on railroad tracks.

FIG. 10 is an end elevation of the vehicle shown in FIG. 9.

FIG. 11 is a side elevation similar to FIG. 9 but showing the set-off wheels rotated 90° about a vertical axis and rest-on set-off rails.

FIG. 12 is a partial side elevation of a vehicle equipped with pneumatic wheels and a bolster arrangement in the form of a dolly suspended from the underside of the vehicle chassis by turnbuckles, the upper half of the bolster forming a support for the pneumatic wheels while the lower half of the bolster is fitted with flanged wheels for travel on railroad tracks.

FIG. 13 is an end elevation of the arrangement shown in FIG. 12.

FIG. 15 is an enlarged side elevation, partly in section of one of the set-off wheels shown in FIG. 9.

FIG. 16 is a view similar to FIG. 15 but showing the set-off wheel rotated through 90° about a vertical axis and locked in position for engagement with a set-off rail in the manner shown in FIG. 10.

FIG. 17 is a longitudinal vertical section of an arrangement to permit limited rotation of the bolster assembly.

FIG. 18 is a vertical section on the line 18—18 of FIG. 17.

FIG. 19 is a modified form of the arrangement shown in FIGS. 17 and 18.

FIG. 20 is a vertical section on the line 20—20 of FIG. 19.

FIG. 21 is a view similar to FIG. 9 except that the centrally located pneumatic wheels are eliminated and pneumatic wheels replace the flanged set-off wheels.

Figure 14:
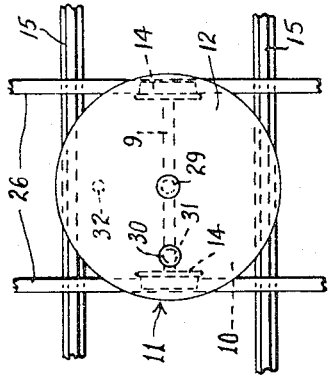
FIG. 14 is an enlarged plan view of the bolster arrangement shown in FIGS. 1, 4, 6 or 9 showing the means for locking it when in engagement with set-off rails.

Referring to the drawings, the trailer type vehicle 5 can have a single or a multiple axle arrangement and can be designed for travel either directly on railroad tracks or on the highway, or can be designed for exclusive use either on railroad tracks or on the highway.

The vehicle 5 is provided with an underchassis 6 and a forwardly extending bracket 7 carrying the usual attachment 8 for connecting the trailer 5, either to an automotive vehicle for highway travel, or to a unit of work equipment or roadway machine that will provide locomotive power to haul the trailer along the railroad tracks.

In the form shown in FIGS. 1 to 5 the vehicle 5 is provided with a wheel supporting axle 9 mounted on the rotatable lower half 10 of the bolster 11 whose upper half 12 is supported on the underchassis 6. The axle 9 is provided with a springing arrangement 13. A pair of flanged wheels 14 are shown mounted on the axle 9 and adapted for travel on the rails 15 which constitute a railway. A pair of pneumatic wheels 16 are shown carried on the side of the vehicle 5. These pneumatic wheels 16 can be substituted for the flanged wheels 14 when the vehicle is to be operated on the highway.

In FIGS. 1 to 5 there is shown a system of set-off wheels and rails similar to that shown in my co-pending patent application Ser. No. 305,492 now Patent No. 3,286,654, issued Nov. 22, 1966 and consists of two pairs of set-off wheels 17 mounted on the ends of the brackets 18 whose ends opposite from the wheels are pivoted at 19 to the vehicle chassis 6. Any suitable catch means 20 is employed to support the brackets 18 up under the chassis 6 when the vehicle is riunning on the rails 15 or on the highway. A brace member 21 pivoted to the chassis 6, adjacent to each bracket 18, at 22, has its opposite end 23 secured to the boss 24 on the bracket 18. The means 20 for holding the brackets 18 up under the chassis 6 can also be employed to hold the brace members 21 in the raised position.

Two pairs of jacks 25 are employed to raise the vehicle 5 sufficiently to permit a set of set-off rails 26 to be laid transversely across the top of the rails 15 under the set-off wheels 17. The set-off rails 26 extend sideways beyond the rails 15 and are provided with removable sections 27 directly over the rails 15 for removal to permit passage of other traffic over the rails while the vehicle is located on the set-off rails to the side of the track. The level of the set-off rails 26 is maintained by means of jacks 28 which, after the flanged wheels 14 have been replaced by the pneumatic wheels 16, can be lowered to permit the pneumatic wheels to make contact with the ground and the vehicle be removed for travel on the highway.

Figure 8:
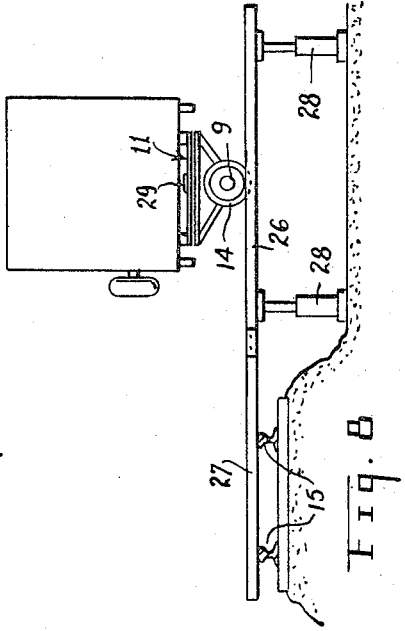
FIG. 8 is an end elevation of the arrangement shown in FIG. 7 showing the vehicle moved sideways on the set-off rails to a position above a highway road surface.

The lower half of the bolster 11 on which the axle 9 is mounted, is rotatable about the king pin 29. This freedom of movement of the bolster member 10 and axle 9 permits the trailer 5 more freedom to negotiate curves, etc., and also permits the trailer to move at higher speeds on the railroad tracks. However, in order to maintain the vehicle stable while it is being run out on the set-off rails 26, the two halves 10 and 12 of the bolster are locked together by means of the pin 30 passing through the apertures 31 in both halves of the bolster, when the lower half 10 is rotated through 90° to bring the axle 9 parallel with the rails 15 and at right angles to the set-off rails 26, as shown in FIGS. 8 and 14.

The bolster member 10 and axle 9 can also be locked with the upper half 12 of the bolster when the axle 9 is at right angles to the rails 15 by engaging the pin 30 in the aperture 32 in the member 10. This is of advantage when the trailer is being pulled along a highway.

In the arrangement shown in FIGS. 9, 10 and 11 the trailer 5 is equipped with pneumatic wheels 33 for highway travel and the set-off wheels 34 are utilized for both travel on the railroad tracks 15 and the set-off rails 26. In this arrangement the set-off wheeel brackets 35 are shown in detail in FIGS. 15 and 16. The brackets 35 each have an upper member 36 and a lower member 37 telescopically mounted in the upper member 36. The upper member 36 is pivotally mounted on the underchassis 6 by means of the pin 38 for movement in the fore and aft direction of the trailer 5, and is secured in a vertical position by means of the disengagable brace member 39. The upper member 36 has a longitudinal bore 40 within which the lower member 37 is mounted. A spring 41 is interposed between the end 42 of the lower member 37 and the bottom of the bore 40. The lower end of the member 37 is forked at 43 to receive the set-off wheel 34. Suitable means such as member 20 shown in FIG. 4 holds the brackets 35 up under the chassis 6 when the vehicle is travelling on a highway.

When the set-off wheels 34 are running on the rails 15 the lower member 37 is free to rotate about a vertical axis in order that the wheels 34 will accommodate themselves to curves on the rails. The wheels 34 are maintained in pressure contact with the rails 15 by the springs 41 in order to eliminate the possibility of derailment of the trailer.

When it is desired to transfer the trailer from railroad travel to highway travel, the trailer is jacked up in the manner shown in FIG. 4 and the lower member 37 is rotated through 90° into the position shown in FIGS. 11 and 16 with the wheels 34 supported on the set-off rails 26. The lower members 37 are locked in this position by the pins 44 passing through the aperture 45 in the lower members 37 and the apertures 46 in the upper members 36. Provision is also made for the pin 44 to lock the lower member 37 in the upper member 36 when the wheels 34 are in the position shown in FIG. 15.

Figure 6:
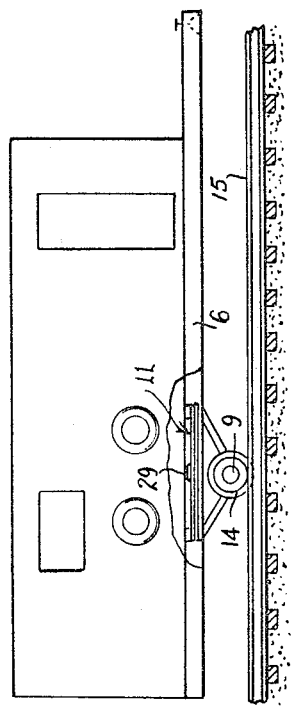
FIG. 6 is a side elevation similar to FIG. 1 but without set-off wheels.
Figure 7:
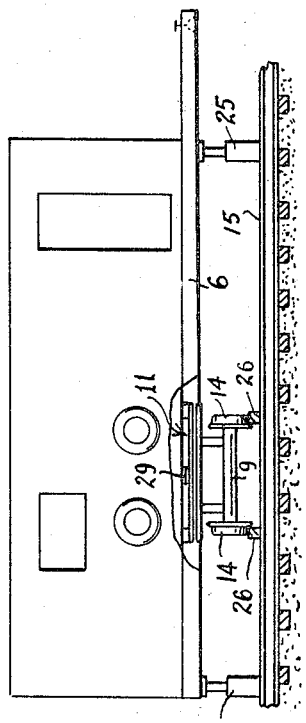
FIG. 7 is a view similar to FIG. 6 but showing the vehicle elevated and the bolster mounted flanged wheels rotated through 90° and resting on set-off rails.

In the arrangement shown in FIGS. 12 and 13 the trailer is equipped with pneumatic wheels 33 the same as in FIGS. 9, 10 and 11. A removable four wheel bolster dolly 47 takes the place of the bolster 11 in FIG. 6. The bolster dolly 47 has an upper member 48 and a lower member 49 rotatable with respect to the member 48 of the king pin 50. The fore and aft ends of the upper member 48 are secured to the underchassis 6 by the turnbuckles 51. This upper member 48 is provided with a pair of spaced apart longitudinal recessed tracks 52 on its upper side, the said tracks being aligned to receive the pneumatic wheels 33 when the dolly is raised up under the wheels by the turnbuckles 51. The lower member 49 of the bolster dolly is equipped with two pairs of dished wheels 53 for running on the railroad tracks 15 and the member 49 will rotate to permit the trailer to negotiate curves with ease. When desired, the lower member can be locked to the upper member 48 by means of the pin 54.

The arrangement shown in FIGS. 12 and 13 can be fitted with set-off wheels either in the manner shown in FIG. 1 or 9.

The bolster dolly 47, as shown in FIGS. 12 and 13, permits the vehicle to be run on the rails 15 and the full load of the vehicle is transferred through the pneumatic wheels 33, the dolly 47 and the dished wheels 53 to the rails 15. When the vehicle is to be used for highway travel, the dolly 47 is separated from the turnbuckles 51 and the vehicle lowered on its pneumatic wheels to the highway level, and the turnbuckles are secured under the chassis 6.

Although the retractable dished wheel arrangement has been shown and described in its simplest form by a simple spring means 13, held in position by a simple pin means and the wheels retracted by manual means, nevertheless, it can be readily seen that these assemblies and those of the combination dish rail travel and set-off wheels shown in FIGS. 9, 10, 15 and 16, can be sprung for example by mechanical, hydraulic, air, torsion bar or a combination of these means and the dished wheel assemblies can be moved into place, held or retracted by mechanical, hydraulic, air or a combination of such means.

In FIG. 21 there is shown a modification of the assembly in FIGS. 9, 10 and 11 in which the centrally located pneumatic highway wheels 33 are dispensed with and the dished track wheels 34 are removed and replaced by pneumatic wheels 34a for highway travel.

The bolster arrangements described and illustrated provide a range of rotation of the axle and wheel assembly about a vertical axis. However, in some instances such a wide range of rotation of the axle assembly may be replaced by a semi-rigid arrangement whereby the rotation of the axle assembly is limited. Such arrangements are disclosed in FIGS. 17, 18, 19 and 20.

In FIGS. 17 and 18 the device 55 consists of a metal rectangular box 56 within which is mounted a rectangular block of elastic material 57, such as rubber. This device can be secured to the axle assembly 9 of the trailer and also to the under side of the trailer chassis 6, or to one only of these points. In the drawings the device is shown attached to the under side of the chassis 6 and is aligned in a fore and aft direction with respect to the trailer. The rubber block 57 is secured to the member 58, which may be the underside of the chassis 6, by the bolts 59. The box 56 is held in place by the washers and nuts 60 threaded on the ends of the bolts 59 projecting through the large diameter apertures 61 in the bottom wall 62 of the box. The large diameter apertures 61 together with the adjacent large diameter bolt holes 63 in the rubber block 57 permit the device to move a limited amount as the force on the brace member 64 dictates. In an axle assembly such as this there will be four such devices, one pair extending aft at each end of the axle 9 adjacent the wheels thereon and another pair extending forwardly of the axle 9 and in alignment with the aft extending devices. Any rotative movement of the axle 9 in a horizontal plane, due to the wheels rounding a curve in the railroad track, will cause the brace members 62 to exert a push or pull on the elastic member 57 and the elastic member will limit the movement of the axle.

A modified form of this movement limiting device is shown in FIGS. 19 and 20 in which the block of elastic material is eliminated and a flat plate 65, similar to the bottom wall 62 of the box 56, is permitted limited movement by reason of the large diameter apertures 66 in the plate 65 about the bolts 67 fitted in the member 68 which may be the underside of the chassis 6. The plate 65 can be made rigid with the member 68 for highway travel by means of the pins 69 being passed through the same size apertures 70 in both members.

It will be understood that the axle movement limiting devices shown in FIGS. 17 to 20 are illustrative only and could be replaced by other devices such as springs.

In certain instances it is desirable to retain a fixed axle assembly on the trailer vehicle without sacrificing the benefits of the bolster in providing maneuverability on curves etc. This flexibility in a horizontal plane is obtained by means of the coupling arrangements shown in FIGS. 22 to 26.

Figure 22:
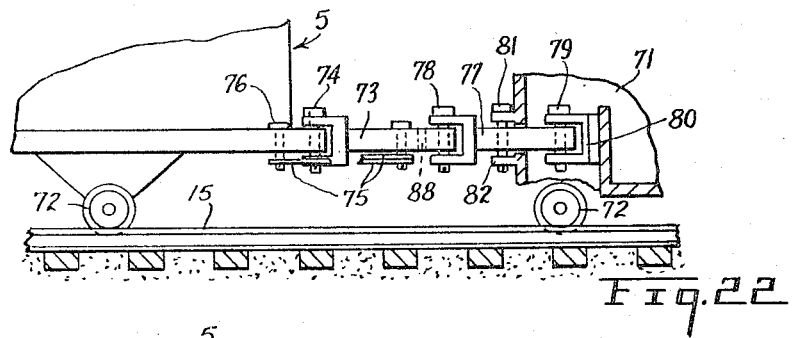
FIG. 22 is a vertical elevation of a modified coupling arrangement between the trailer vehicle and the haulage vehicle whereby maneuverability of the bolster arrangement shown in FIG. 1 is obtained where a fixed axle and flanged wheels on the trailer are required.
Figure 23:
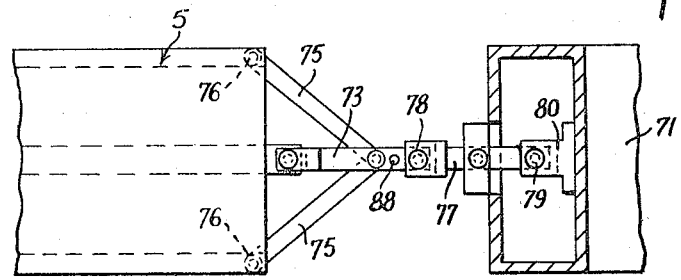
FIG. 23 is a plan view of the arrangement shown in FIG. 22.

In FIGS. 22 and 23 the trailer-type vehicle 5 and the haulage vehicle 71 are equipped with flanged wheels 72 for travel on the rails 15. The hitch member 73 is attached to the trailer underchassis 6 by the pin 74 which permits a hinge type movement in a horizontal plane at this point. The hitch member 73 can be made rigid with respect to the vehicle 5 by the addition of the brace members 75 which are attached to the chassis 6 by the pins 76. The hitch member 77 is attached to the hitch member 73 by the pin 78 permitting a hinge type movement in a horizontal plane between the members 73 and 77. The opposite end of the hitch member 77 is attached to the frame of the haulage vehicle 71 by the pin 79 passing through the clevis 80, permitting a hinge type movement in the horizontal plane between the hitch member 77 and the haulage vehicle 71, which is pulling the vehicle 5. The hitch member 77 can be made rigid with respect to the vehicle 71 by the pin 81 passing through the clevis 82.

With the above arrangement the hitch members 73 and 77 can have a hinge type movement in the horizontal plane by means of the pins 74, 78 and 79. When the hitch members 73 and 77 are made rigid with their respective vehicles 5 and 71 a hinge type movement in a horizontal plane is still possible by means of the pin 78.

Figure 24:
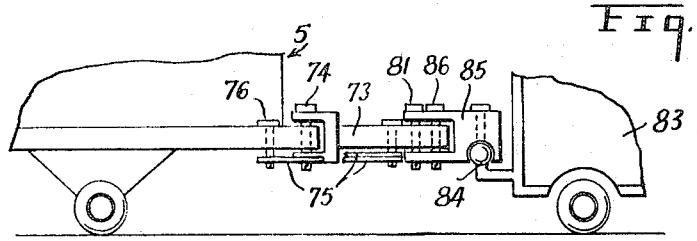
FIG. 24 is a view similar to FIG. 22 but showing the trailer equipped with pneumatic wheels and attached to a highway haulage vehicle.

In FIG. 24 the trailer vehicle 5, equipped with pneumatic wheels, is shown attached to a highway haulage vehicle 83 which is provided with a ball coupling member 84. The vehicle 5 is provided with a hitch member 73 attached to the vehicle 5 by the pin 74 and can be made rigid by the brace members 75, just as in FIGS. 22 and 23. An adapter 85 is fitted between the hitch member 73 and the ball coupling member 84 by means of the pin 86, permitting a hinge type movement in a horizontal plane between the hitch member 73 and the adapter 85. The adapter 85 can be made rigid with the hinge member 73 by means of the pin 81 passing through the aperture 88 in the member 73, seen more clearly in FIG. 23.

Figure 25:
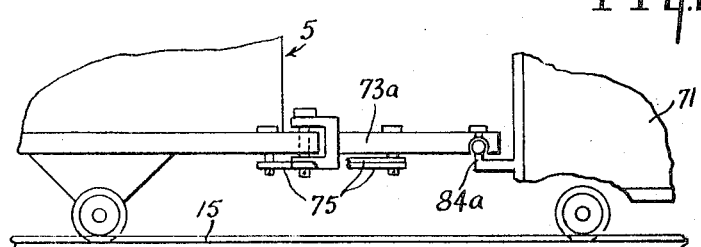
FIG. 25 is a view similar to FIG. 22 but showing the railroad trailer haulage vehicles equipped with a highway ball-type coupling.
Figure 26:
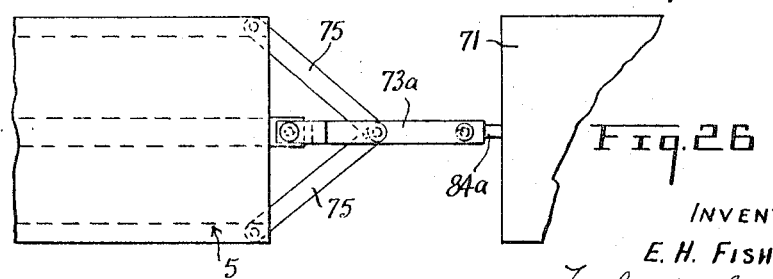
FIG. 26 is a plan view of the arrangement shown in FIG. 25.

In FIGS. 25 and 26 the vehicles 5 and 71 are equipped with flanged wheels 72 the same as in FIGS. 22 and 23. However, the hitch member 73a is adapted to fit on the ball coupling member 84a secured to the vehicle 71.

In FIGS. 22 to 26 a large variation in the degree of hinge movement in the horizontal plane between the trailer-type vehicle and the haulage vehicle can be obtained by making the coupling members fully hingeable about the various connecting pins or by making one or all of the hitch members 73 and 77 rigid in the manner shown. By this means the trailer can be provided with the necessary maneuverability to enable it to take the curves on either railroad tracks or on highways.

The invention as above described permits a trailer to be operated on railroad tracks or on a highway in the most efficient manner desired for both types of travel. The bolster arrangement, whether applied to the flanged wheel or pneumatic wheel axle assembly or to the set-off wheels, permits the trailer to run on railroad tracks and take the track curves with ease. The bolster arrangement also permits the trailer to be moved transversely of the railroad tracks on set-off rails, rapidly with a minimum of effort by the work crew.

What I claim is:

1. A system for adapting a trailer for travel on a highway or on a railway, and for moving it sideways from the highway and railway comprising, in combination:
   (a) a trailer body;
   (b) an underchassis whereon the trailer body is mounted;
   (c) axle means supported on the underchassis and arranged therebelow;
   (d) means mounting the axle means on the underchassis for rotation about a vertical axis for at least 90°;
   (e) a set of rail engaging wheels rotatably mountable on the axle means;
   (f) removable set-off rails mountable transversely of the railway for moving the trailer sideways,
      (1) the rail engaging wheels engaging the railway in one angular position of the axe means and the set-off rails in another angular position of the axle means whereby the trailer is movable on the railway in the one position and sideways over the set-off rails in the other position;
   (g) a set of pneumatic tired wheels mountable on underchassis for engagement with said highway when the trailer moves over the same; and
   (h) jack means for lifting said underchassis to a height sufficient to lift said rail engaging wheels from an engaged railway.

2. The system of claim 1, wherein the rail engaging wheels are removably mounted on the axle means and the pneumatic tired wheels may be removably mounted on said axle means when the rail engaging wheels are removed therefrom.

3. The system of claim 1, further comprising an additional axle means supported on the underchassis and arranged therebelow, the pneumatic tired wheels being mounted on the additional axle means, and the additional axle means extending in a horizontal plane closer to the underchassis than the horizontal plane wherein the first-named axle means extends.

4. The system of claim 3, wherein the means for mounting the axle means is movable in respect of the underchassis whereby the axle means is removable from the horizontal plane wherein it extends and the pneumatic tired wheels are in ground-engaging position.

5. The system of claim 4, wherein the means for mounting the axle means is pivotally secured to the underchassis for pivotal movement lengthwise of the trailer, disengageable brace means connecting the mounting means and the underchassis for holding the rail engaging wheels in a first position wherein the wheels engage the railway and a second position wherein the rail engaging wheels are pivoted above the horizontal plane wherein the additional axle means extends.

6. The system of claim 1, wherein the means mounting the axle means on the underchassis includes a first member secured to the underchassis and a second member rotatably mounted on the first member, the axle means being mounted on the second member, and means for locking the second member to the first member against relative rotation.

7. The system of claim 6, further comprising an additional axle means supported on the underchassis and arranged therebelow, the pneumatic tired wheels being mounted on the additional axle means, and the additional axle means extending in a horizontal plane closer to the underchassis than the horizontal plane wherein the first-named axle means extends; the first mounting means member defining a pair of tracks receiving the pneumatic tired wheels when the rail engaging wheels engage the rails; the axle means mounted on the second mounting means member including a pair of axles whereon the rail engaging wheels are mounted; and a pair of disengageable turnbuckles connecting the first member to the underchassis.

8. The system of claim 1, wherein the means mounting the axle means on the underchassis includes a sleeve extending vertically from the underchassis and having a central bore having a vertical axis, and a lower member telescopically mounted in the bore of the sleeve for rotation about said vertical axis.

9. The system of claim 8, further comprising locking means for locking the lower member to the sleeve against relative rotation.

10. The system of claim 8, further comprising a compression spring mounted in said bore and bearing against the lower member.

References Cited

UNITED STATES PATENTS

| | | | |
|---|---|---|---|
| 658,142 | 9/1900 | Dunn et al. | 105—177 |
| 929,440 | 7/1909 | Iliff | 105—177 |
| 1,543,452 | 6/1925 | Seitz et al. | 105—215 |
| 1,742,154 | 12/1929 | Vernon | 105—215 |
| 1,786,463 | 12/1930 | Thomas | 105—159 |
| 1,906,109 | 4/1933 | Schmidt | 105—177 |
| 1,908,959 | 5/1933 | Cullen et al. | 105—177 |
| 2,003,007 | 5/1935 | Morgan | 105—1 |
| 2,630,078 | 3/1953 | Euwer | 105—1 |
| 2,920,580 | 1/1960 | Williams | 105—159 |
| 2,981,209 | 4/1961 | Flemming | 105—215 |
| 3,130,686 | 4/1964 | Fiechter et al. | 105—215 |

ARTHUR L. LA POINT, *Primary Examiner.*

H. BELTRAN, *Assistant Examiner.*